United States Patent [19]

Hasegawa et al.

[11] 4,437,561

[45] Mar. 20, 1984

[54] AUTOMATIC CONTINUOUS WEIGHING MACHINE

[75] Inventors: Eiichi Hasegawa, Kobe; Shoji Yamano, Akashi, both of Japan

[73] Assignee: Yamato Scale Company, Ltd., Hyogo, Japan

[21] Appl. No.: 351,864

[22] Filed: Feb. 24, 1982

[30] Foreign Application Priority Data

Mar. 3, 1981 [JP] Japan .................................. 56-30891

[51] Int. Cl.³ ............................................. G01G 11/00
[52] U.S. Cl. .................................... 198/504; 198/570; 177/145
[58] Field of Search ............................... 198/504–505, 198/570; 177/145

[56] References Cited

U.S. PATENT DOCUMENTS

| | | | |
|---|---|---|---|
| 2,905,310 | 9/1959 | Stoeckel et al. | 198/504 |
| 3,955,665 | 5/1976 | Pettis, Jr. et al. | 198/505 |
| 4,238,027 | 12/1980 | Oelte | 198/504 |
| 4,353,276 | 10/1982 | Ackerfeldt | 198/570 |

FOREIGN PATENT DOCUMENTS 45-605086 1/1970 Japan .

*Primary Examiner*—Joseph J. Rolla
*Assistant Examiner*—Kevin P. Shaver
*Attorney, Agent, or Firm*—Eugene E. Geoffrey, Jr.

[57] ABSTRACT

An automatic continuous weighing machine of the belt conveyer type which can weigh a number of articles successively fed thereto, the improvement of which is that plural pairs of endless chains and corresponding weighing units are included, each of the weighing units being operatively coupled to each pair of chains, so that the articles to be weighed are successively put on the different pairs of chains and weighed by the corresponding weighing units without interference with the measurement of the adjoining articles, thereby enabling reduction of the feeding interval of the articles and a corresponding increase of weighing speed and efficiency.

3 Claims, 9 Drawing Figures

AUTOMATIC CONTINUOUS WEIGHING MACHINE

This invention relates to an improvement in the automatic continuous weighing machine which is especially useful in weight selection in the production line for packing foods in cans, bottles or retort pouches, for example, at high speed such as 400 to 600 pieces per minute.

A typical example of an automatic continuous weighing machine is disclosed in Japanese Pat. No. 605,086 (Publication No. 45-32303). The machine of this patent includes a set of endless chains arranged side by side in a plane to form an endless conveyer on which the articles to be weighed are fed sequentially. The chains move on a set of rails which are coupled to a weighing unit, so that the weight of each article is sensed by the weighing unit while the article passes the rails defining the weighing location together with the chains. In order to increase efficiency or weighing speed, that is, the number of articles weighed per unit time of this type of machine, an increase of the chain or conveyer driving speed has been considered. However, this results in reduction of accuracy of the measurement due to the influence of the after effect of the preceding article and an upper limit of the conveyer speed exists. Thus, the weighing efficiency is limited generally to 60 to 120 pieces per minute for the articles weighing about 500 grams or less, though it may be 200 to 300 pieces per minute at the sacrifice of accuracy.

Recently, however, the processing efficiency in the production line of canned or bottled foods has been improved in each section generally to about 500 pieces per minute, and the filling machine and the packing machine are operated at such order of efficiency. In order to effect weight control action in such a production line, a plurality of such weighing machines must be provided in each line and this results in problems such as demand for addition of a distributing device for distributing the articles to the respective weighing machines and a corresponding complicated production line and increased occupation space.

Accordingly, an object of this invention is to provide an automatic continuous weighing machine utilizing the prior art weighing system, which can be not only operated at improved efficiency but also produced relatively economically and controlled easily as compared with the prior art machine.

In accordance with this invention, there is provided a machine comprising a plurality of endless conveyers arranged in superposition with each other and driven at the same speed along a common transporting path and a plurality of weighing units arranged in series along the transporting path and operatively coupled to the respective conveyers to sense the weights of articles carried on the corresponding conveyers. Each of the conveyers comprises a plurality of elongated flexible endless circulating members each having article supporting subsections disposed in lengthwise direction at predetermined intervals. The circulating members of the respective conveyers are arranged in parallel with each other to provide superposition of the conveyers such that the article supporting subsections belonging to each conveyer are aligned laterally to constitute a series of article supporting sections and the article supporting sections of the respective conveyers are arranged to appear sequentially and recurrently along the transporting path in mechanically independent fashion. Thus, when the articles to be weighed are fed one by one at a specific time interval so that they ride just over the successive article supporting sections, their weights are sensed individually by the weighing units coupled to the corresponding circulating members without suffering from mechanical interference of the other articles.

Now, the invention will be described in more detail with reference to the accompanying drawings.

IN THE DRAWINGS

Throughout the drawings, like reference numerals are used to denote like structural components.

Figure 1:
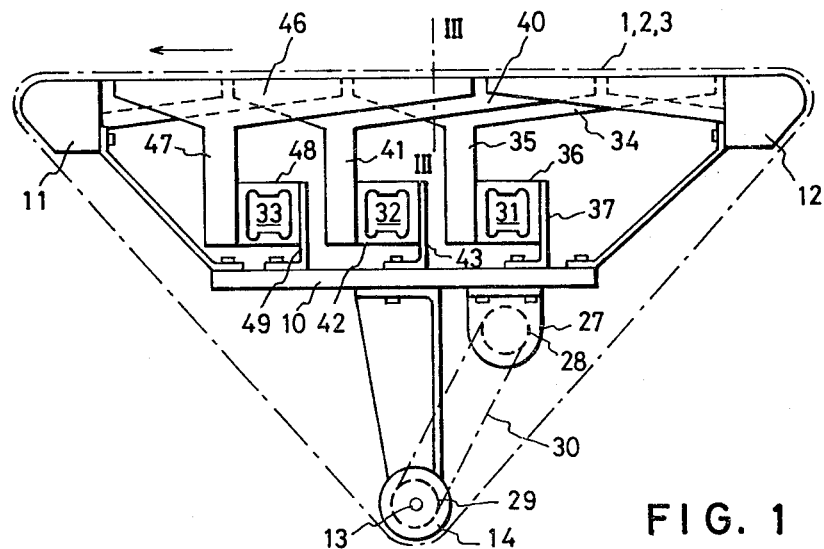
FIG. 1 is a schematic side view representing a first embodiment of the weighing machine according to this invention.
Figure 2:
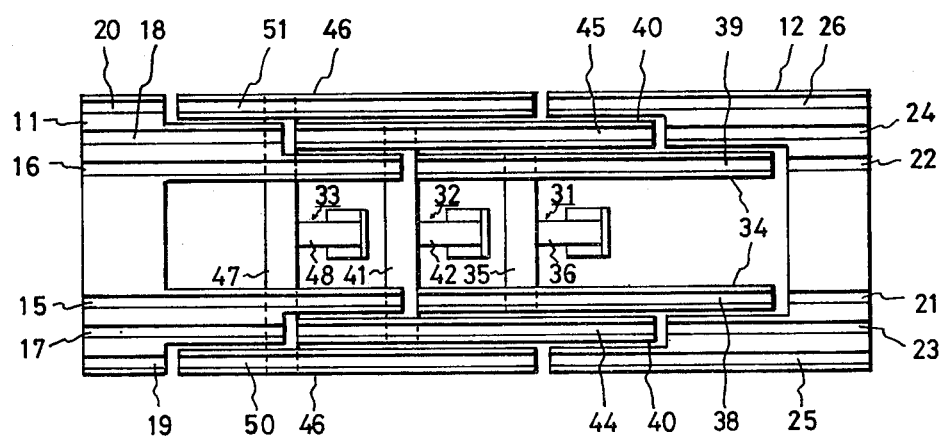
FIG. 2 is a partially simplified plan view of the embodiment of FIG. 1.
Figure 3:
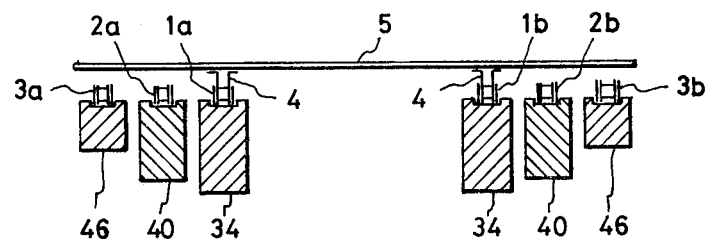
FIG. 3 is an enlarged sectional view along the line III—III of FIG. 1.
Figure 4:
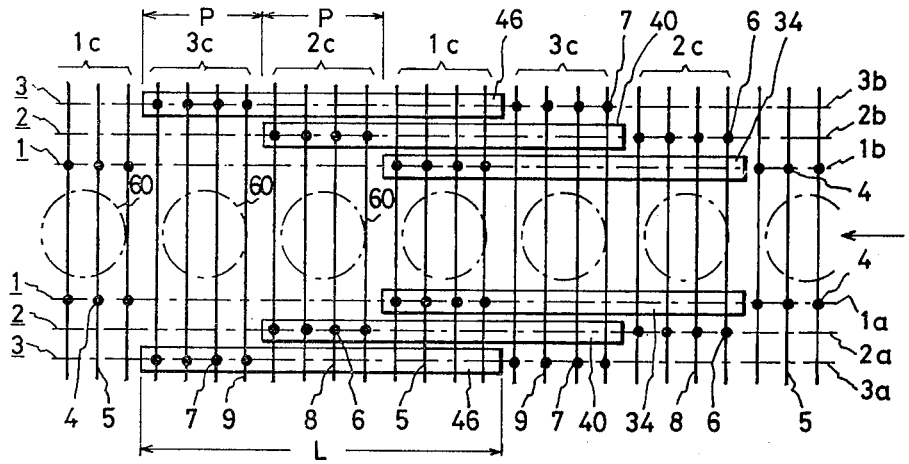
FIG. 4 is a diagrammatic plan view of the embodiment of FIG. 1 provided for an aid of explanation of operation of this embodiment.
Figure 8:
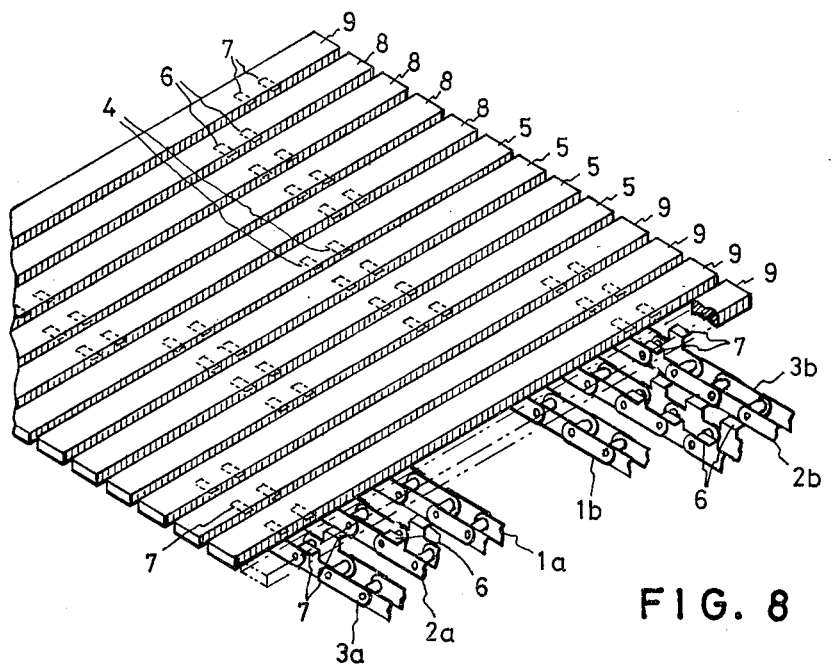
FIG. 8 is a partly broken-away perspective view representing the conveyers of the embodiment of FIG. 1.

Referring to FIGS. 1 through 4 and FIG. 8, the first embodiment of this invention is shown as including three conveyers 1, 2 and 3. The conveyer 1 includes a pair of endless chains 1a and 1b stretched in parallel and provided with groups of supporting projections 4 at predetermined intervals along its lengthwise direction. Each group of projections includes several projections 4 (for example, four as shown in FIG. 8) extending upwardly from the successive chain elements, as shown in FIGS. 3 and 8. The respective supporting projections 4 of both chains 1a and 1b are aligned laterally and elongated rod or strip-like members 5 are attached thereto so as to bridge both chains. Similarly, as shown in FIGS. 4 and 8, the conveyers 2 and 3 comprise pairs of endless chains 2a, 2b and 3a, 3b having groups of supporting projections 6 and 7 and rod or strip-like members 8 and 9 attached to the projections, respectively. All chains are stretched about chain guides 11 and 12 supported on a table 10 (legs of the table 10 are omitted for simplification) and six sprocket wheels 14 fixed on a shaft 13 which is rotatably supported under the table 10.

As shown in FIG. 2, in order to guide the chains 1a, 1b, 2a, 2b, 3a and 3b in mutually parallel relationship, parallel guide grooves 15, 16, 17, 18, 19 and 20 are formed in the chain guide 11 and parallel guide grooves 21, 22, 23, 24, 25 and 26 are formed in the chain guide 12. A driving motor 27 having a sprocket wheel 28 on the driving shaft is fixed to the table 10 and a driven sprocket wheel 29 is fixed to the shaft 13, so that the sprocket wheels 14 and, in turn, the endless chains are driven at a predetermined speed in a predetermined direction, as shown by an arrow in FIG. 1, through a chain belt 30 by the motor 27.

As shown in FIG. 4, the groups of bridge members 5, 8 and 9 form article supporting sections 1c, 2c and 3c of the conveyers 1, 2 and 3, respectively, which are arranged sequentially and interveningly along the transporting direction of the conveyers. However, it should be understood that the respective sections 1c, 2c and 3c are completely independent in vertical movement of each other and move at the same speed along the same transporting path. On the table 10, there are fixed three weighing units 31, 32 and 33 associated with the conveyers 1, 2 and 3, respectively.

The weighing unit 31 is composed of a pair of cradles 34, a weighing frame 35 connecting both cradles, a load cell structure 36 fixed to the frame 35 and a stand 37 fixed to the load cell structure and table 10. The cradles 34 are straight elongated members having guide grooves 38 and 39 in the upper surfaces and are arranged between and substantially in a same plane as the chain guides 11 and 12 such that the guide grooves 38 and 39 are aligned with the guide grooves 15, 16 and 21, 22 of the chain guides 11 and 12, respectively, and so as not to contact the chain guides 11 and 12. Thus, the chain 1a of the conveyer 1 passes the guide grooves 21, 38 and 15 and the chain 1b passes the guide grooves 22, 39 and 16. When an article is put on the article supporting section 1c of the conveyer 1, its weight will act to the load cell structure 36 as the section 1c passes over the cradles 34.

The weighing units 32 and 33 are similarly constructed to the weighing unit 31. Specifically, the weighing unit 32 is composed of cradles 40, a weighing frame 41, a load cell structure 42 and a stand 43. The cradles 40 have guide grooves 44 and 45 which are arranged between the guide grooves 17, 18 and 23, 24 of the chain guides 11 and 12, respectively. The weighing unit 33 is composed of cradles 46, a weighing frame 47, a load cell structure 48 and a stand 49. The cradles 46 have guide grooves 50 and 51 which are arranged between the guide grooves 19, 20 and 25, 26, respectively.

As shown in FIG. 4, the lengths of the cradles 34, 40 and 46 are the same and referred to as "L". The weight of the article can be sensed by the corresponding weighing unit while the corresponding article supporting section is completely on the cradles. Accordingly, the size "L" is selected to accommodate the desired conveyer speed or weighing efficiency within a measurable range. The disposition pitch (that is, length plus interval) of the article supporting sections on each conveyer is made equal to "L" and, therefore, the "resultant" pitch "P" of the "combined" conveyers is L/N, wherein N is the number of component conveyers and, in this example, three. Accordingly, the length or the size in the moving direction of each article supporting section is slightly less than the pitch "P". Thus, any pair of cradles can always carry a single article supporting section and an article thereon and the weight of this article can be sensed by the corresponding weighing unit. While, in this embodiment, the positions of the cradles 34, 40 and 46 are shifted from each other by an amount corresponding to the pitch "P" in the moving direction of the conveyers, this is due to consideration of facilitating disposition, mounting and maintenance of the load cell structures.

In operation, the articles to be weighed are successively and accurately put one by one on the successive article supporting sections 3c, 2c and 1c, at the right end of the conveyers in this embodiment, as shown by chain line circles 60 in FIG. 4. In order to execute this feeding operation automatically, a suitable article feeder synchronized with the movement of the conveyers 1, 2 and 3 is preferably utilized. As the feeder has no direct connection to this invention, no description will be made thereof. The weight of article 60 put on the article supporting section 1c of the conveyer 1 is sensed by the weighing unit 31 in response to a predetermined command signal during its passage of the cradles 34. After completion of measurement, when the present article supporting section 1c begins to come out of the cradles 34, the next article supporting section 1c begins to come in to the same cradles. The latter article supporting section 1c lies completely upon the cradles 34 when the former article supporting section 1c has come out of the cradles 34. This is also the case with the other conveyers 2 and 3 and the articles 60 on the article supporting sections 2c and 3c are weighed during their passage on the cradles 40 and 46, respectively.

It can be noted that the weighing efficiency, that is, the number of articles which can be weighed per unit time is trebled by this embodiment as compared with the prior art machine which is composed of one of the conveyers 1, 2 and 3 and the corresponding weighing unit. Although three sets of such combination of conveyer and weighing unit are used in this embodiment, no distributing device is required since all sets of the combination have a common article transporting path.

Figure 5:
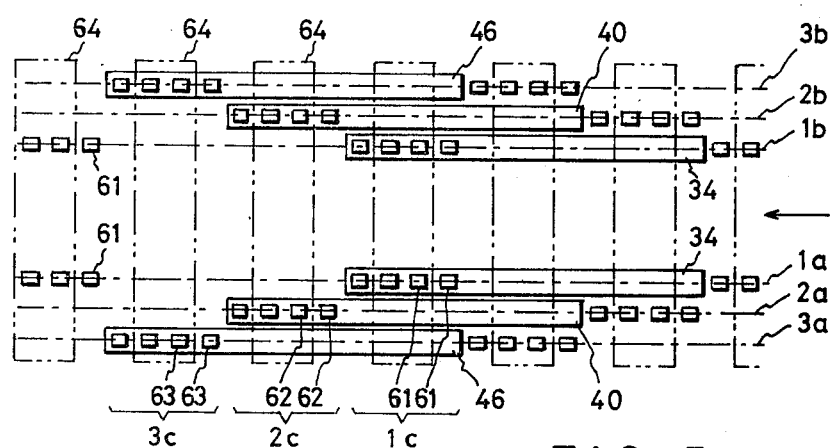
FIG. 5 is a diagrammatic plan view representing a variation of the embodiment of FIG. 1.
Figure 9:
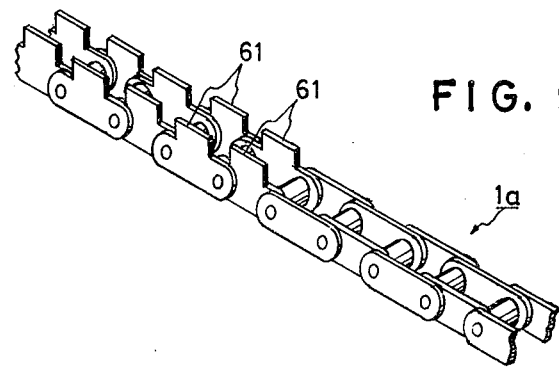
FIG. 9 is an enlarged perspective view representing a part of the chain 1a of the embodiment of FIG. 5.

FIG. 5 shows a variation of the first embodiment described above, which can be used for the articles having an elongated box-like shape. Although the structure of this variation is almost the same as that of the first embodiment, the bridge members 5, 8 and 9 are omitted and some modification may be made on the article supporting sections 1c, 2c and 3c. The conveyer chains 1a, 1b, 2a, 2b, 3a and 3b of this variation also have groups of supporting projections 61, 62 and 63, respectively, as in the first embodiment. These projections may be similar in shape to the aforementioned projections 4, 6 and 7 or may be modified as shown by 61 in FIG. 9. The articles to be weighed are successively put directly on the groups of supporting projections 61, 62 and 63, as shown by ghost boxes 64 in FIG. 5 and weighed in the same manner as in the first embodiment.

Figure 6:
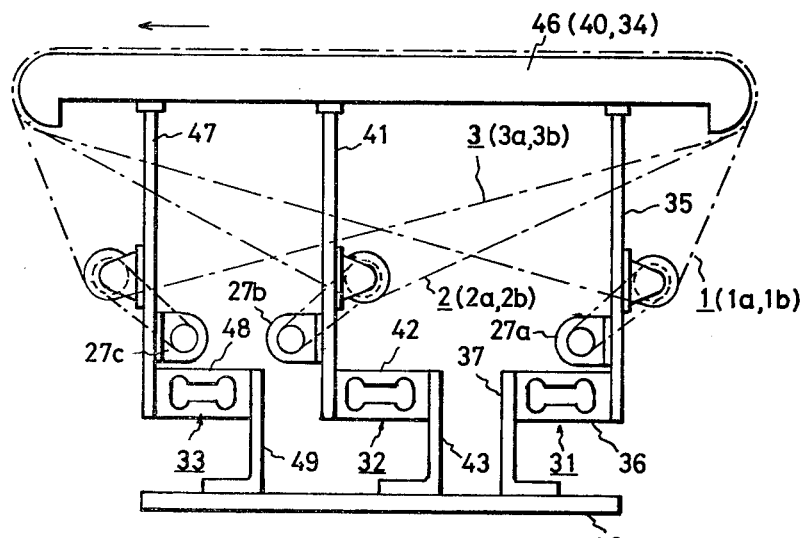
FIG. 6 is a schematic side view representing a second embodiment of this invention.
Figure 7:
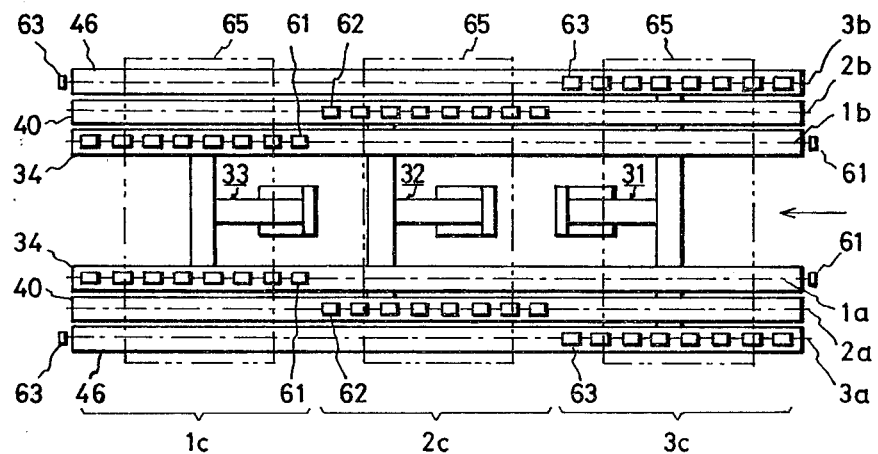
FIG. 7 is a schematic plan view representing the embodiment of FIG. 6.

The second embodiment of this invention shown in FIGS. 6 and 7 differs from the first embodiment in that the respective conveyers 1, 2 and 3 have their own driving motors 27a, 27b and 27c which rotate synchronously with each other, respectively, no chain guide corresponding to 11 and 12 is provided and the cradles 34, 40 and 46 occupy the whole length of the machine. As readily understood from the combination of FIGS. 4, 5 and 7, the length of the machine can be made substantially equal to the size "L" which is significantly less than the length of the first embodiment. Though the bridging members 5, 8 and 9 (FIG. 8) are omitted in the embodiment of FIG. 7, they may be provided when needed, as in the first embodiment. Alternatively, the three conveyers may be driven by a common motor as in the first embodiment.

While, in the above description, the embodiments have been shown as having three sets of conveyers and weighing units each, this number of sets can be optionally selected as a design parameter. Moreover, though the conveyers have been shown to comprise endless chains, other endless circulating members, such as rubber or textile belts, can be used if they can be driven in accurate synchronism. While, in the above description, one pair (two) of endless chains have been used in each conveyer, three or more chains may be used in parallel and intervening fashion as occasion demands.

What is claimed is:

1. An automatic continuous weighing machine, comprising a plurality of endless conveyers driven at the same speed, and a plurality of weighing units, each weighing unit operatively coupled to one of said conveyers, respectively, for sensing weights of articles carried on said conveyers, each of said conveyers including a plurality of endless circulating members arranged in parallel, characterized in that said endless circulating members of the respective conveyers are arranged in mutually parallel intervening fashion, whereby said conveyers each have a common article transporting path, each of said endless circulating members having a plurality of article supporting subsections arranged at predetermined intervals in the lengthwise direction, said article supporting subsections belonging to each conveyer being aligned laterally to form article supporting sections of said conveyer, said article supporting sections of the respective conveyers being arranged sequentially in series along said article transporting path to allow themselves to move at least vertically, independently of each other.

2. An automatic continuous weighing machine, according to claim 1, wherein said article supporting subsections of said endless circulating members of each conveyer are coupled with lateral bridging members, respectively.

3. An automatic continuous weighing machine, according to claim 1, wherein said endless circulating members are composed of endless chains and said article supporting subsection is composed of projections extending upwardly from the chain elements of said chain.

* * * * *